(Model.)
T. A. & A. T. HILL.
Fertilizer Distributer.
No. 231,801. Patented Aug. 31, 1880.
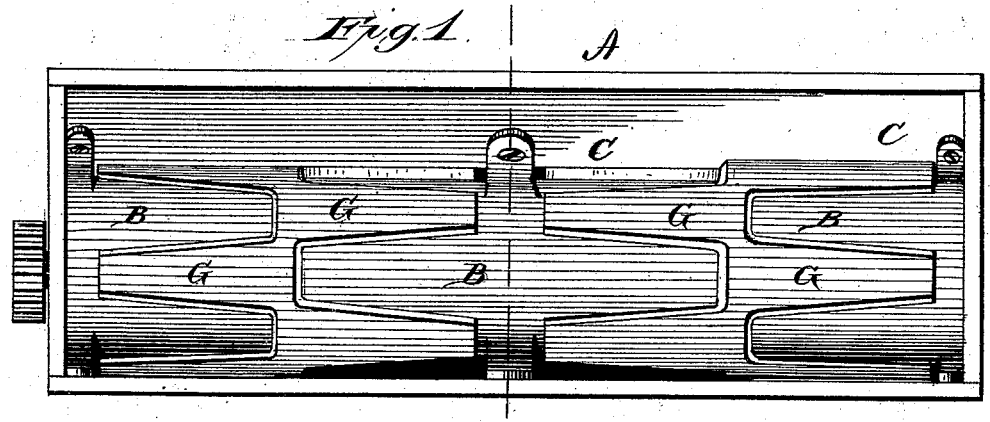
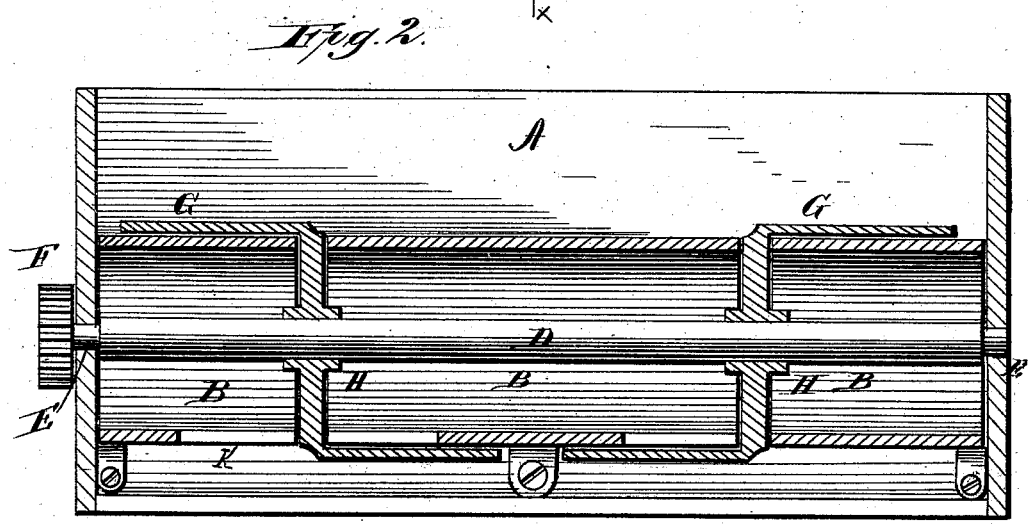
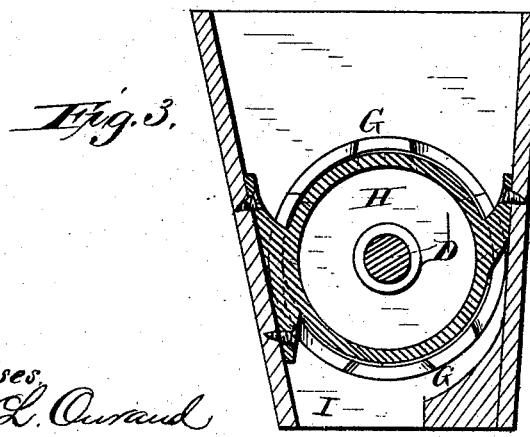
Witnesses: Inventor:
Franck L. Durand Truman A. Hill
H. Aubrey Toulmin Albert T. Hill
By Alexander & Mason, Atty
per T.

UNITED STATES PATENT OFFICE.

TRUMAN A. HILL AND ALBERT T. HILL, OF MOUNT MORRIS, NEW YORK.

FERTILIZER-DISTRIBUTER.

SPECIFICATION forming part of Letters Patent No. 231,801, dated August 31, 1880.

Application filed July 19, 1880. (Model.)

*To all whom it may concern:*

Be it known that we, TRUMAN A. HILL and ALBERT T. HILL, of Mount Morris, in the county of Livingston, and in the State of New York, have invented certain new and useful Improvements in Fertilizer-Distributers; and we do hereby declare that the following is a full, clear, and exact description thereof, reference being had to the accompanying drawings, and to the letters of reference marked thereon, making a part of this specification.

This invention relates to certain improvements in fertilizer-distributers; and it has for its objects to provide an apparatus whereby dry fertilizers may be uniformly distributed in a finely-divided state over the surface of a field. These objects we attain by the mechanism illustrated in the accompanying drawings, in which—

Figure 1 represents a top view of our improved distributing apparatus; Fig. 2, a longitudinal vertical section thereof, and Fig. 3 a transverse vertical section on the line $x\ x$ of Fig. 1.

The letter A indicates the hopper or fertilizer-receptacle of our improved apparatus, which may be mounted upon wheels or upon a suitable frame adapted to travel upon wheels in any convenient manner. Within said hopper, near the lower part thereof, are located the longitudinal cylinders B, which may be slightly tapering, as shown in the drawings, although this is not essential. These cylinders may be of any desired number within convenient limits, three being represented in the present instance. The cylinders are provided with perforated lugs or ears C, by which they are secured to the interior of the hopper by screws, bolts, or other suitable fastening devices. These lugs or ears may be located at any convenient points on the peripheries of the cylinders, preferably at the ends of the end cylinders and at the center of the central cylinder, as represented in the drawings.

The letter D indicates a longitudinal shaft journaled in bearings E at opposite ends of the hopper, and passing axially through the cylinders. The projecting end of said shaft carries a pinion or toothed gear-wheel, F, by means of which rotary motion may be imparted to the shaft through the medium of suitable gearing connecting with the driving wheel or wheels.

The letter G indicates a series of scrapers adapted to travel or rotate around the peripheries of the respective cylinders and in contact, or very nearly in contact, therewith. The said scrapers extend horizontally, or nearly so, from the peripheries of the vertical disks H, which are rigidly mounted on the shaft D so as to rotate with it.

The scrapers and the disks are usually constructed of cast-metal sections in one piece, and in the present instance the scrapers project on opposite sides of the disks, so as to traverse the cylinders at each side, the said scrapers alternating on opposite sides, as indicated.

The sides of the scrapers are beveled to a sharp edge, as indicated in Fig. 3, in order to break up any lumps of fertilizer before passing between the same and the peripheries of the cylinders.

It is evident that our apparatus may be somewhat modified without departing from the spirit of our invention, which consists, essentially, of a series of movable scrapers adapted to traverse a stationary rubbing-surface of any kind. For instance, a horizontal bed with suitable scraping-arms adapted to move in contact therewith may be employed, if found convenient.

The operation of our invention will be readily understood in connection with the above description, and is as follows: The scrapers are put in rotation as the shaft D is rotated through the gearing connected with the driving wheel or wheels. As they rotate in contact with the peripheries of the cylinders they pulverize and comminute it and carry it forward, and finally distribute through the opening I at the bottom of the hopper.

The lower portions of the cylinders may be cut away or cast open, as indicated by the letter K, in order to give lightness to the apparatus.

Having thus described our invention, what we claim, and desire to secure by Letters Patent, is—

1. The combination, in a fertilizer-distributer, of one or more stationary cylinders or rubbing-surfaces with one or more rotating scrapers adapted to traverse such cylinders or rubbing-surfaces, as and for the purposes specified.

2. In combination with the cylinders located in the lower part of the hopper, the rotating shaft journaled longitudinally in said hopper and passing axially through the cylinders, and the disks secured to said shaft and provided with lateral arms adapted to traverse the peripheries of the cylinders, substantially as and for the purposes specified.

In testimony that we claim the foregoing we have hereunto set our hands and seals this 24th day of June, 1880.

TRUMAN A. HILL. [L. S.]
  ALBERT T. HILL. [L. S.]

Witnesses:
 G. C. BRANCH,
 OSCAR ALLEN.